(12) United States Patent
Yamanaka et al.

(10) Patent No.: US 8,897,667 B2
(45) Date of Patent: Nov. 25, 2014

(54) IMAGE READER AND IMAGE FORMING APPARATUS

(71) Applicant: Sharp Kabushiki Kaisha, Osaka (JP)

(72) Inventors: Hisashi Yamanaka, Osaka (JP); Mitsuharu Yoshimoto, Osaka (JP); Kenji Nakanishi, Osaka (JP); Yasuhiro Suto, Osaka (JP); Shohichi Fukutome, Osaka (JP); Masahiro Imoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/661,649

(22) Filed: Oct. 26, 2012

(65) Prior Publication Data
US 2013/0108309 A1    May 2, 2013

(30) Foreign Application Priority Data

Oct. 27, 2011   (JP) ................. 2011-235650

(51) Int. Cl.
| | | |
|---|---|---|
| G03G 15/00 | (2006.01) | |
| H04N 1/00 | (2006.01) | |
| G03G 21/20 | (2006.01) | |
| H04N 1/10 | (2006.01) | |
| H04N 1/028 | (2006.01) | |
| H04N 1/12 | (2006.01) | |
| H04N 1/193 | (2006.01) | |

(52) U.S. Cl.
CPC .......... *H04N 1/00909* (2013.01); *H04N 1/1013* (2013.01); *H04N 1/02865* (2013.01); *H04N 1/1235* (2013.01); *H04N 2201/0094* (2013.01); *H04N 1/00981* (2013.01); *H04N 1/193* (2013.01); *G03G 21/206* (2013.01)
USPC .......................................... 399/92; 358/1.13

(58) Field of Classification Search
CPC ..... G03G 15/00; G03G 21/206; G03G 15/08; H04N 1/00519
USPC ............. 358/1.13, 474, 505; 399/53, 92, 4, 7, 399/220, 94; 369/89, 294, 373; 362/373
See application file for complete search history.

(56) References Cited

U.S. PATENT DOCUMENTS

| | | | |
|---|---|---|---|
| 6,204,936 B1 * | 3/2001 | Ishizuka ....................... 358/474 |
| 2009/0268263 A1 | 10/2009 | Ichinose | |

(Continued)

FOREIGN PATENT DOCUMENTS

| | | |
|---|---|---|
| JP | 08-328162 | 12/1986 |
| JP | 01-194567 | 8/1989 |

(Continued)

OTHER PUBLICATIONS

Machine translaton JP11-272146 Kazuaki et al.*

(Continued)

*Primary Examiner* — G. M. Hyder
*Assistant Examiner* — Travis Harper
(74) *Attorney, Agent, or Firm* — Nixon & Vanderhye P.C.

(57) ABSTRACT

An image reader is provided, in its housing, with a first scanning unit made up of an LED array of a plurality of LED elements that are arranged in a row in the horizontal scanning direction and that emit light to a document. An air intake port and an air exhaust port are disposed on the housing of the image reader. An imaginary line of an air flow path coupling the air intake port and the air exhaust port to one another is configured to pass adjacent a center of the LED array of the first scanning unit in the horizontal scanning direction with the first scanning unit stopped at a reading position of the document transferred by a document transfer device.

12 Claims, 17 Drawing Sheets

(56) References Cited

U.S. PATENT DOCUMENTS

| | | | |
|---|---|---|---|
| 2011/0020022 A1* | 1/2011 | Obara et al. | 399/53 |
| 2011/0182604 A1* | 7/2011 | Otsuka et al. | 399/53 |

FOREIGN PATENT DOCUMENTS

| | | |
|---|---|---|
| JP | 08-328162 | 12/1996 |
| JP | 11-272146 | 10/1999 |
| JP | 2000-124646 | 4/2000 |
| JP | 2001-144907 | 5/2001 |
| JP | 2002-040582 | 2/2002 |
| JP | 2007-318406 | 12/2007 |
| JP | 2007-381406 | 12/2007 |
| JP | 2008-177664 | 7/2008 |
| JP | 2009-133933 | 6/2009 |
| JP | 2009-229984 | 8/2009 |
| JP | 2009-267796 | 11/2009 |

OTHER PUBLICATIONS

Machine translaton JP2009-229984 Katamoto.*

* cited by examiner

FIG.17

| Position of measurement | (1) Exhaust fan not provided | (2) Exhaust fan provided No shield on openings and gaps | | (3) Exhaust fan provided Shield on openings and gaps | | |
|---|---|---|---|---|---|---|
| | Maximum temperature | Maximum temperature | (2)-(1) | Maximum temperature | (3)-(1) (Temperature difference) | (3)-(2) (Temperature difference) |
| (A) LED substrate Temperature at the center | 81.4 | 72.6 | -8.8 | 64.7 | -16.7 | -7.9 |
| (B) LED substrate Temperature at the end | 73.2 | 67.3 | -5.9 | 63.8 | -9.4 | -3.5 |
| (A)-(B) | 8.2 | 5.3 | -2.9 | 0.9 | -7.3 | -4.4 |

IMAGE READER AND IMAGE FORMING APPARATUS

CROSS-REFERENCE TO RELATED APPLICATIONS

The present application claims priority under 35 U.S.C. §119(a) to Japanese Patent Application No. 2011-235650, filed Oct. 27, 2011. The contents of this application are herein incorporated by reference in their entirety.

FIELD OF THE INVENTION

The present invention relates to an image reader provided, in its housing, with a light source unit made up of light sources including a plurality of light emitting devices arranged in a row in the horizontal scanning direction to emit light to a document. The present invention also relates to an image forming apparatus provided with the image reader.

CONVENTIONAL ART

Some image readers are provided with a light source unit made up of light sources including a plurality of light emitting devices (LED elements) arranged in a row in the horizontal scanning direction. These image readers encounter a rise in temperature of the light emitting devices especially when continuously transferring a large quantity of documents using a document transfer device to continuously read the documents. This is because with the light source unit fixed at the reading position, the light emitting devices continue lighting for a long period of time (or do the lighting semi-continuously, that is, are turned off only during the time between the documents transferred side by side). In this case, the light emitting devices disposed at the center in the horizontal scanning direction are influenced by the heating of the light emitting devices disposed on both sides of the center light emitting devices, and therefore encounter a particularly higher rise in temperature than the light emitting devices disposed on the sides in the horizontal scanning direction. To accommodate to a long period of continuous reading, there has been a need for inhibiting a rise in temperature of the light emitting devices, especially inhibiting a rise in temperature of the light emitting devices disposed at the center in the horizontal scanning direction. This is also important in respect of ensuring the performance and service life of the light emitting devices.

Patent documents 1 and 2 disclose inhibiting a rise in temperature of the image reader.

Patent document 1 discloses an image reader to inhibit a rise in temperature of a document placement glass that corresponds to a distal end in the document reading direction. For this purpose, this image reader includes a ventilation cooling fan disposed on the rear surface side of the housing (optical box) of the image reader and in the vicinity of the distal end of the image, where the rise in temperature is most noticeable. On a surface opposite the surface on which the cooling fan is disposed (that is, on the front surface side of the housing of the image reader), a hole (air exhaust port) is disposed to discharge air sent from the cooling fan. According to the image reader recited in patent document 1, the air sent from the cooling fan flows straight through the housing (optical box) of the image reader to the hole on the opposite surface (see the arrow C in FIG. 1 of patent document 1).

Patent document 2 discloses an image reader including three cooling fans arranged, based on a document placement position, at predetermined intervals in the horizontal scanning direction. The cooling fans each correspond to a different one of the LED light sources including a plurality of LED elements arranged in a row, and send air individually to the region of the corresponding LED element.

[Patent Document 1] Japanese Unexamined Patent Application Publication No. 11-272146.
[Patent Document 2] Japanese Unexamined Patent Application Publication No. 2009-133933.

SUMMARY OF THE INVENTION

The image reader recited in patent document 1 is for the purpose of inhibiting a rise in temperature of the document placement glass, and is not for the purpose of directly cooling an exposure lamp (halogen lamp) serving as a light source for a first scanning optical portion. Additionally, the light source is a halogen lamp and does not encompass a light source unit (first scanning optical portion) made up of light sources including a plurality of LED elements arranged in a row in the horizontal scanning direction. Thus, in the image reader recited in patent document 1, the air-sending cooling fan and the hole (air exhaust port) through which to exhaust air are respectively disposed on the rear surface side and on the front surface side of the housing of the image reader and are opposed to one another (in parallel) in the horizontal scanning direction. If this configuration were applied to a light source unit made up of light sources including a plurality of LED elements arranged in a row in the horizontal scanning direction, the direction of the air flow path would be identical to the direction in which the LED elements are arranged. This results in the LED elements on the cooling fan side being cooled, while the LED elements at the center in the horizontal scanning direction and those on the air exhaust port side being not substantially cooled.

Specifically, if the image reader recited in patent document 1 with the above-described configuration performs a long period of continuous reading with the light source unit using LED elements fixed at the reading position, the LED elements at the center are not sufficiently cooled and encounter a higher rise in temperature, creating a possibility of far exceeding the guarantee temperature of the LED elements.

According to the image reader recited in patent document 2, the three cooling fans directly send air to the regions of the respective, corresponding LED elements. Hence, the regions of the LED elements are expected to be cooled to some degree. To individually control the three cooling fans, one or a plurality of temperature detection sensors are provided at each of the regions to detect the temperature of the LED elements, and based on detection results of the temperature sensors, the cooling fans are controlled to be turn on and off. That is, employing three cooling fans and three or more temperature detection sensors necessitates a complicated control circuit to control the three cooling fans and the three or more temperature detection sensors. This inevitably increases the production cost because of an increase in the piece-part count or other causes. Additionally, no air exhaust port is disposed in the configuration of the image reader recited in patent document 2. Hence, air sent from the cooling fans is only slightly released out of the housing of the image reader through gaps or the like and mostly circulated in the housing of the image reader. This creates a possibility of the circulating air being warmed to degrade the cooling effect. In particular, when the image reader performs a long period of continuous reading with the light source unit fixed at the reading position, the cooling effect rapidly degrades to cause a rise in temperature especially of the LED elements at the center, creating a possibility of far exceeding the guarantee temperature of the LED elements.

The present invention has been made in view of the above-described circumstances, and it is an object of the present invention to provide an image reader that includes a light source unit made up of light sources including a plurality of LED elements arranged in a row in the horizontal scanning direction and that efficiently inhibits a rise in temperature of the LED elements at the center in the horizontal scanning direction and of the LED elements adjacent the center LED elements, especially when performing a long period of continuous reading with the light source unit fixed at the reading position. It is also an object of the present invention to provide an image forming apparatus provided with the image reader.

In order to accomplish the above-described object, an image reader according to the present invention includes a light source unit including light sources including a plurality of light emitting devices that are arranged in a row in a horizontal scanning direction and that are configured to emit light to a document. An air intake port and an air exhaust port are disposed on a housing of the image reader. An imaginary line of an air flow path coupling the air intake port and the air exhaust port to one another is configured to pass adjacent a center of the light sources of the light source unit in the horizontal scanning direction with the light source unit stopped at a reading position of the document transferred by a document transfer device.

With this configuration, devising the positions of the air intake port and the air exhaust port ensures that an efficient air flow path of cooling air is formed without using a duct. The imaginary line of the air flow path passes adjacent the center of the light sources of the light source unit in the horizontal scanning direction with the light source unit stopped at the reading position of the document transferred by a document transfer device. This configuration inhibits a rise in temperature of the center of the light emitting devices and the vicinity of the center (the row of the light emitting devices), where the temperature rise is highest among the light sources.

Also in the present invention, the imaginary line may cross, at an angle, a direction in which the light emitting devices are arranged. Specifically, as viewed from a direction perpendicular to a scanning surface of the light source unit, the imaginary line may cross, at an angle, the direction in which the light emitting devices are arranged. Also as viewed from the horizontal scanning direction along a horizontal scanning surface of the light source unit, or as viewed from a vertical scanning direction orthogonal to the horizontal scanning direction along the horizontal scanning surface of the light source unit, the imaginary line may cross, at an angle, the direction in which the light emitting devices are arranged.

The imaginary line crosses, at an angle, the arrangement direction at the vicinity of the center of the row of the light emitting devices. Specifically, making the imaginary line cross the row of the light emitting devices from, for example, an obliquely upward direction to an obliquely downward direction (or from an obliquely downward direction to an obliquely upward direction) ensures efficient sending of cooling air to the center of the light emitting devices and the vicinity of the center, and ensures efficient cooling of the center of the light emitting devices and the vicinity of the center, thereby inhibiting a rise in temperature.

Also in the present invention, the air intake port and the air exhaust port may be disposed on side surfaces of the housing of the image reader. Providing the air intake port and the air exhaust port on side surfaces of the housing of the image reader ensures providing a fan on the outer side of the housing of the image reader.

Also in the present invention, an exhaust fan may be disposed on an outer side of the housing of the image reader to face the air exhaust port. Providing an exhaust fan ensures reliable cooling of the light sources of the optical unit.

Also in the present invention, the air intake port may be disposed at one position of the housing of the image reader. Providing the air intake port at one position ensures a reliable flow path (air flow path) of cooling air that prevents air from dispersing in the housing of the image reader.

Also in the present invention, a dust preventive filter may be disposed on the air intake port. Providing a dust preventive filter on the air intake port prevents external dust from entering the image reader and reduces the occurrence of external dust being attached to the dust-sensitive optical units (such as lens, mirror, and CCD). Reducing dust attachment reduces the occurrence of image failure (such as black stripes) that can be caused if dust exists on the read image.

Also in the present invention, openings of the housing of the image reader other than the air intake port and the air exhaust port may be shielded by a shield member. Shielding the other openings of the housing of the image reader by a shield member reduces the occurrence of external dust being attached to the optical units (such as lens, mirror, and CCD). Reducing dust attachment reduces the occurrence of image failure (such as black stripes) that can be caused if dust exists on the read image.

An image forming apparatus according to the present invention may include an image reader of the above-described configuration and an imager to form a toner image of a document image read by the image reader onto a sheet of paper. The present invention provides an image forming apparatus with improved performance and extended service life of the light emitting devices that serve as the light sources of the light source unit.

BRIEF DESCRIPTION OF THE DRAWINGS

FIG. 17 is a table showing test results.

DESCRIPTION OF THE EMBODIMENTS

Embodiments of the present invention will be described in detail below by referring to the accompanying drawings.

Figure 1:
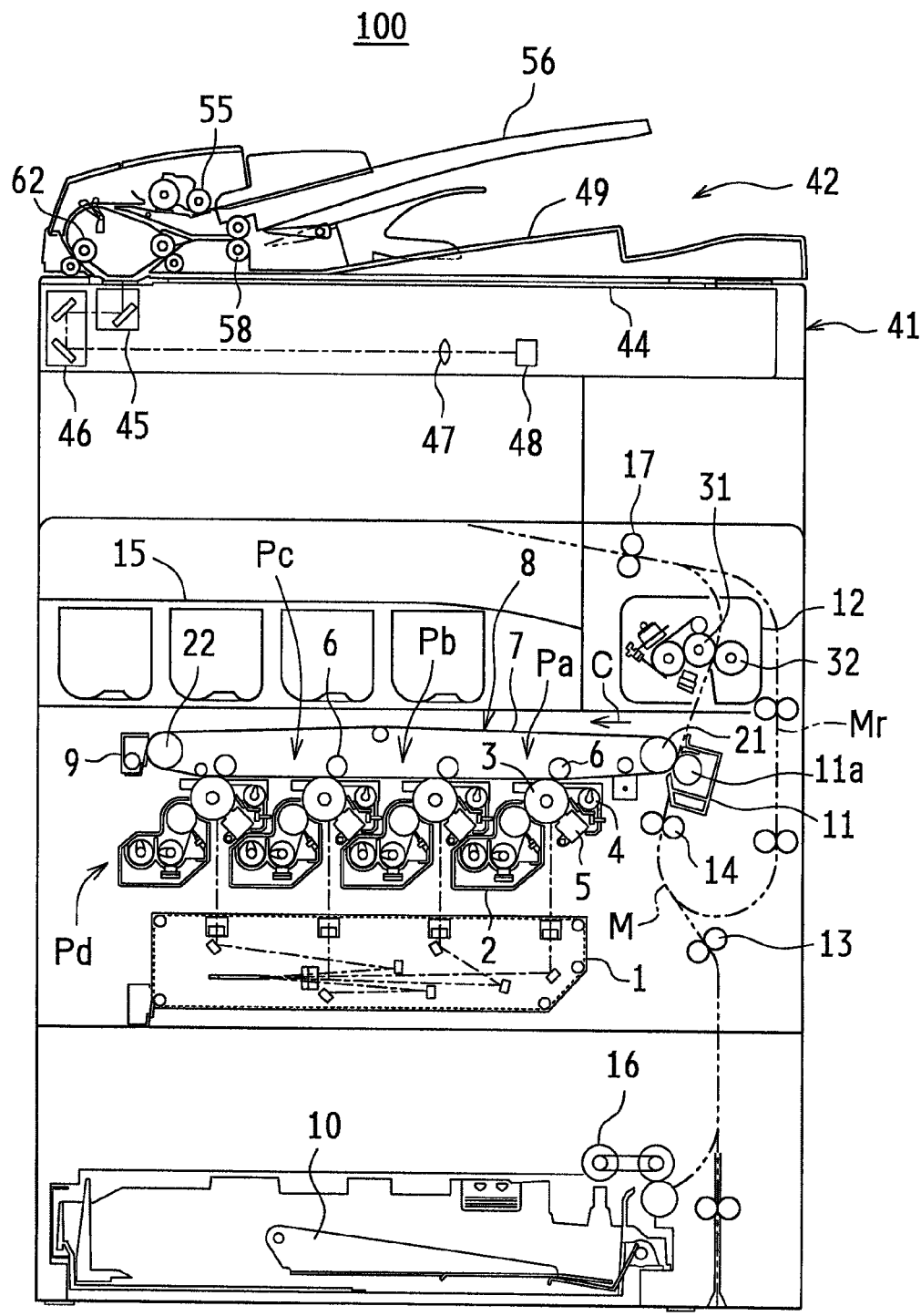
FIG. 1 is a schematic cross-sectional view of an image forming apparatus provided with an image reader according to the present invention.

FIG. 1 is a schematic cross-sectional view of an image forming apparatus provided with an image reader according to the present invention. The image forming apparatus 100 is what is called a multi-purpose machine incorporating the scanner function, the copying function, the printer function, the facsimile function, and other functions.

The image forming apparatus 100 includes a laser exposure device 1, a developing device 2, a photosensitive drum 3, a charger 5, a cleaner device 4, an intermediate transfer belt device 8, a fixing device 12, a paper transfer path M, a feeding tray 10, and a paper discharge tray 15.

The image forming apparatus 100 deals with image data that correspond to color images using colors including black (K), cyan (C), magenta (M), and yellow (Y). Accordingly, to form four kinds of toner images corresponding to the respective colors, the developing device 2, the photosensitive drum 3, the charger 5, and the cleaner device 4 each come in four pieces respectively corresponding to black, cyan, magenta, and yellow, forming four image stations Pa, Pb, Pc, and Pd.

The laser exposure device 1 is a laser scanning unit (LSU) including a laser diode and a reflection mirror. The laser exposure device 1 exposes a charged surface of the photosensitive drum 3 with light in accordance with image data to form an electrostatic latent image corresponding to the image data onto the charged surface of the photosensitive drum 3.

The developing device 2 develops the electrostatic latent image formed on the surface of the photosensitive drum 3 using the (K, C, M, Y) kinds of toner to form a toner image onto the surface of the photosensitive drum 3. The cleaner device 4 removes and collects residual toner on the surface of the photosensitive drum 3 after the developing and image transfer. The charger 5 uniformly charges the surface of the photosensitive drum 3 to a predetermined potential.

The intermediate transfer belt device 8 is disposed above the photosensitive drums 3, and includes an intermediate transfer belt 7, an intermediate transfer belt driving roller 21, an idler roller 22, four intermediate transfer rollers 6, and an intermediate transfer belt cleaning device 9.

The intermediate transfer belt 7 is looped around, and thereby supported by, the intermediate transfer belt driving roller 21, the intermediate transfer rollers 6, the idler roller 22, and other elements. These elements turn the intermediate transfer belt 7 into circumferential movement in the arrow C direction.

The toner images on the surfaces of the photosensitive drums 3 are sequentially transferred to the intermediate transfer belt 7 and superimposed onto each other. Thus, color toner images (toner images of the respective colors) are formed on the intermediate transfer belt 7.

The toner images on the surfaces of the photosensitive drums 3 are accumulated on the intermediate transfer belt 7, resulting in a color toner image indicated by the image data. This color toner image is transferred to the intermediate transfer belt 7, and transferred to a recording sheet of paper at a nip region between the intermediate transfer belt 7 and a transfer roller 11a of a secondary transfer device 11. Receiving the color toner image at the nip region, the recording sheet of paper is transferred to the fixing device 12. The fixing device 12 includes a heating roller 31, a pressure roller 32, and other elements, and transfers the recording sheet of paper by holding it between the heating roller 31 and the pressure roller 32.

The image forming apparatus 100 includes the paper transfer path M through which a recording sheet of paper supplied from the feeding tray 10 is passed through the secondary transfer device 11 and the fixing device 12 and forwarded to the paper discharge tray 15. Along the paper transfer path M, paper pick-up rollers 16, paper registration rollers 14, the fixing device 12, transfer rollers 13, discharge rollers 17, and other elements are disposed.

A recording sheet of paper picked up by the paper pick-up rollers 16 receives a color toner image fixed thereto at the fixing device 12, and after being passed through the fixing device 12, discharged face down onto the paper discharge tray 15 through the discharge rollers 17.

When text is printed on both surfaces of the recording sheet of paper, in the course of transfer of the recording sheet of paper by the discharge rollers 17 on the paper transfer path M, the discharge rollers 17 are stopped and turned into reverse rotation so as to pass the recording sheet of paper through a reverse path Mr and turn the recording sheet of paper upside down. The recording sheet of paper is then guided to registration rollers 14 and an image is recorded on and fixed to the rear surface of the recording sheet of paper in a similar manner to the manner associated with the front surface of the recording sheet of paper, and the recording sheet of paper is discharged onto the paper discharge tray 15.

Figure 2:
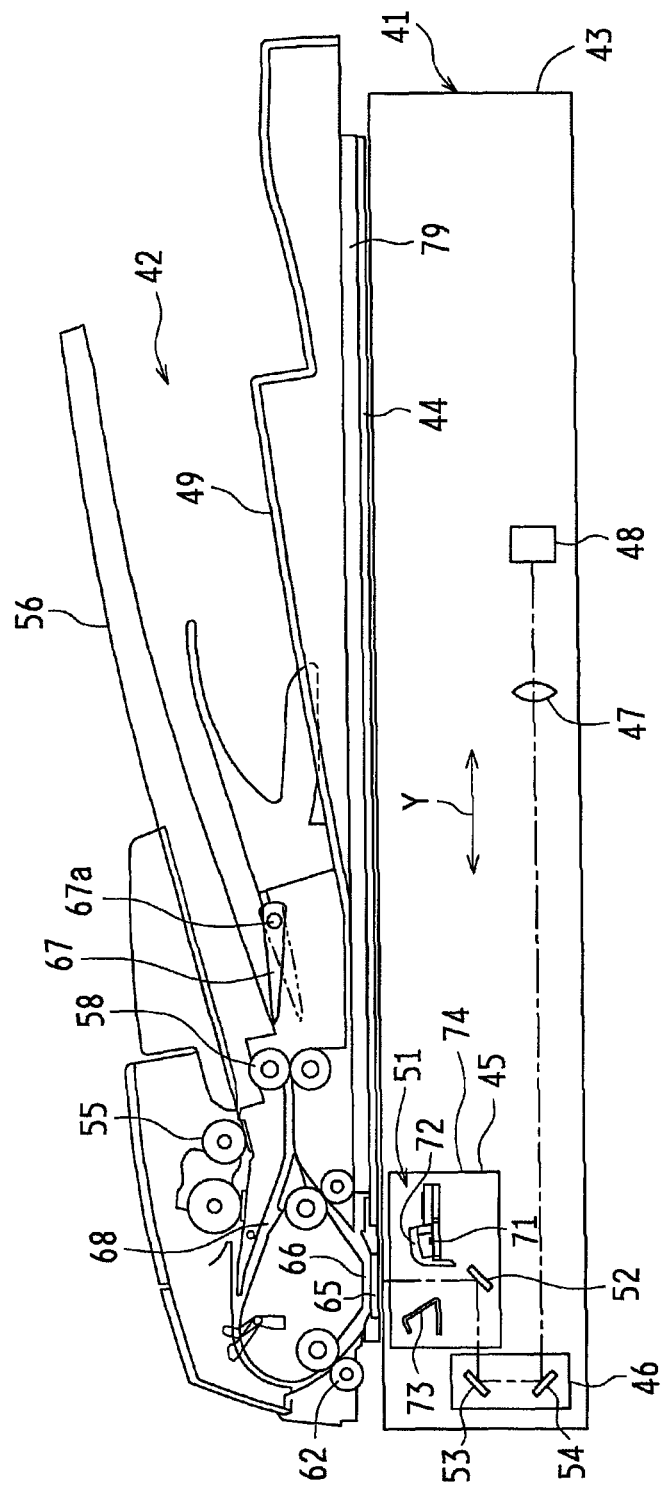
FIG. 2 is an enlarged schematic cross-sectional view of the image reader shown in FIG. 1 and a document transfer device.
Figure 3:
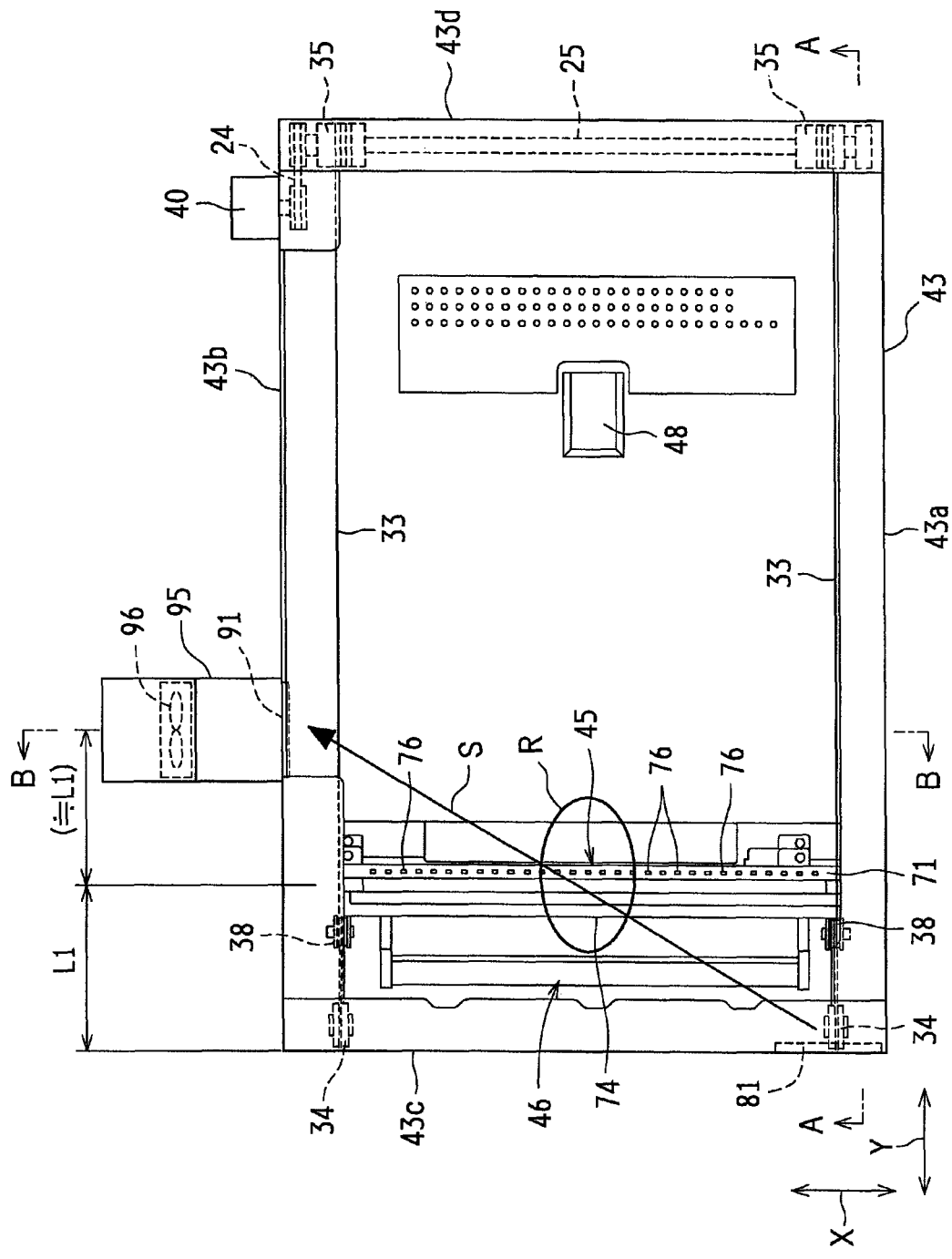
FIG. 3 is a schematic plan view of the image reader with a platen glass removed off the housing of the image reader.
Figure 4:
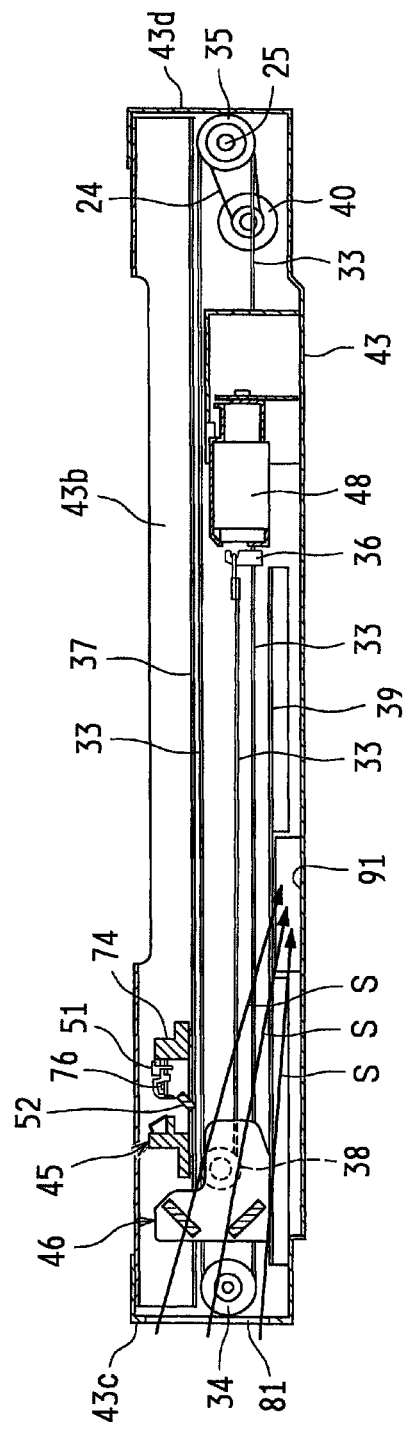
FIG. 4 is a schematic cross-sectional view along the line A-A shown in FIG. 3, corresponding to specific example 1.
Figure 5:
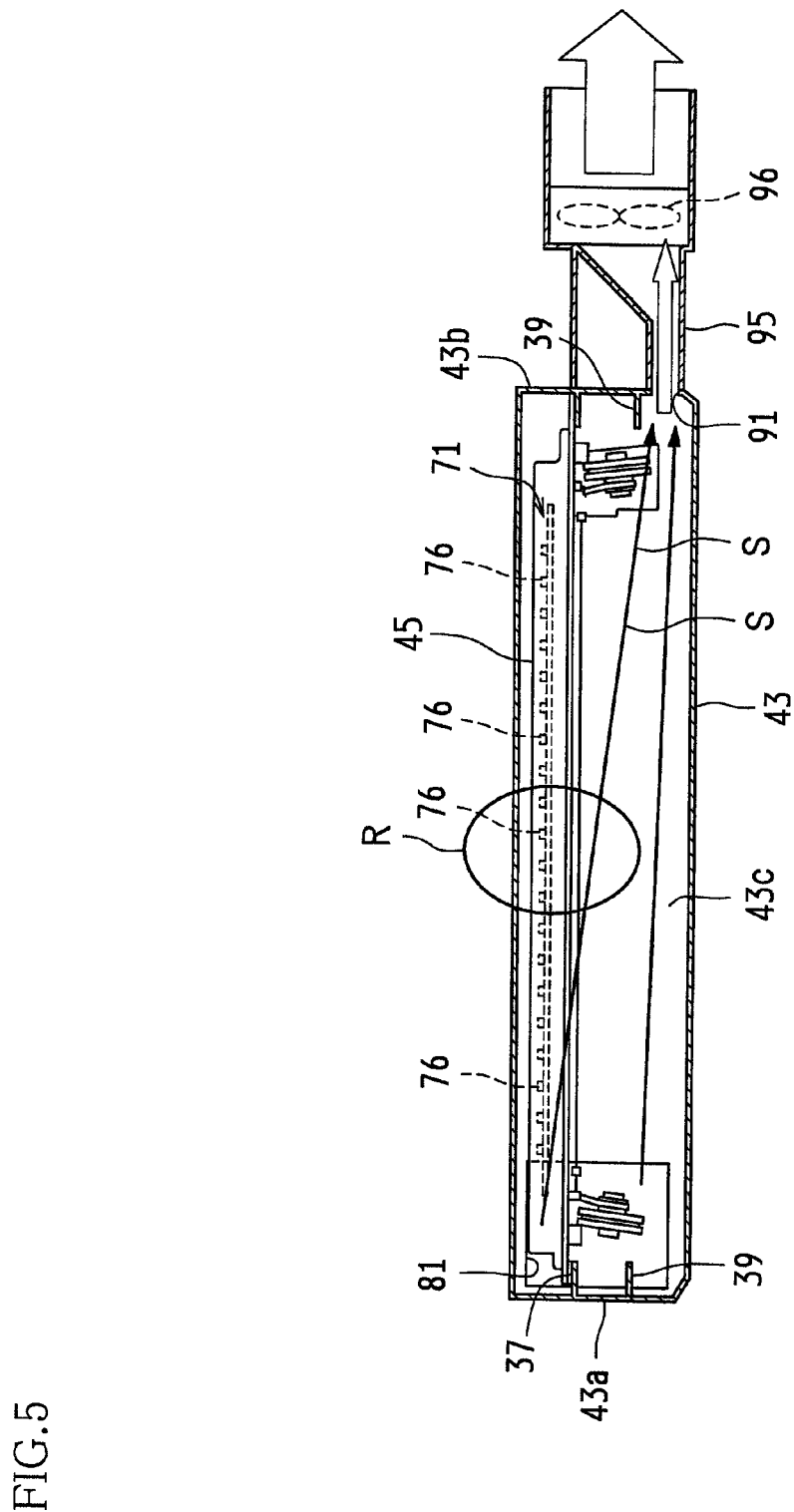
FIG. 5 is a schematic cross-sectional view along the line B-B shown in FIG. 3, corresponding to specific example 1.

Next, an image reader 41 and a document transfer device 42 will be described. FIG. 2 is an enlarged schematic cross-sectional view of the image reader 41 and the document transfer device 42. FIG. 3 is a schematic plan view of the image reader 41 with a platen glass removed off the housing of the image reader 41. FIG. 4 is a schematic cross-sectional view along the line A-A shown in FIG. 3. FIG. 5 is a schematic cross-sectional view along the line B-B shown in FIG. 3.

The document transfer device 42 has its base side pivotally supported by a base side of the image reader 41 through a hinge (not shown). The document transfer device 42 moves its front portion upward and downward so as to open and close itself. When the document transfer device 42 opens, a platen glass 44 of the image reader 41 opens to allow a document to be placed on the platen glass 44.

The image reader 41 includes the platen glass 44 disposed on the upper surface of the housing 43 of the image reader defining the outer frame, a first scanning unit (light source unit) 45, a second scanning unit 46, an imaging lens 47, and a CCD (Charge Coupled Device) 48.

The first scanning unit 45 includes a lighting device 51 and a first reflection mirror 52. The first scanning unit 45, while moving at a constant speed V in a vertical scanning direction Y over a distance corresponding to the document size, exposes the document on the platen glass 44 with light using the lighting device 51, and has the first reflection mirror 52 reflect the reflection light from the document to guide it to the second scanning unit 46. Thus, the image on the document surface is scanned in the vertical scanning direction Y. The second scanning unit 46 includes second and third reflection mirrors 53 and 54, and while moving at a speed V/2 following the first scanning unit 45, has the second and third reflection mirrors 53 and 54 reflect the reflection light from the document to guide the reflection light to the imaging lens 47. The imaging lens 47 concentrates the reflection light from the document to the CCD 48 so as to form the image on the document surface onto the CCD 48. The CCD 48 repeatedly scans the image of the document in the horizontal scanning direction, and at every one round of scanning, outputs an analogue image signal of one horizontal scanning line.

The first scanning unit 45 has wire fixing portions (not shown) at both ends of the first scanning unit 45 in the horizontal scanning direction Y. Driving wires 33 correspond to the respective wire fixing portions and have one end secured to the respective wire fixing portions. The driving wires 33 are looped across support pulleys 34 and driving pulleys 35 respectively disposed on one end and the other end of the housing 43 of the image reader in the vertical scanning direction Y (both ends in the lateral direction in FIGS. 3 and 4). The driving wires 33 have their ends secured to a hook 36 disposed at the center of the bottom surface of the housing 43 of the image reader. The first scanning unit 45 has its both ends supported by guide tracks 37 disposed on a front side surface 43a and a rear side surface 43b of the housing 43 of the image reader. The first scanning unit 45 makes reciprocating movement on the guide tracks 37 in the vertical scanning direction Y.

The second scanning unit 46 has wire fixing portions (not shown) at both ends of the second scanning unit 46. To the wire fixing portions, pulleys 38 are mounted. The driving wires 33 are looped around the respective pulleys 38. The second scanning unit 46 has its both ends supported by the guide tracks 39 disposed on the front side surface 43a and the rear side surface 43b of the housing 43 of the image reader. The second scanning unit 46 makes reciprocating movement on the guide tracks 39 in the vertical scanning direction Y. That is, in conjunction with the first scanning unit 45, the second scanning unit 46 moves in the same direction as the direction in which the first scanning unit 45 moves.

The driving motor 40 is a stepping motor to drive the first scanning unit 45 and the second scanning unit 46. The rotation of the output shaft of the driving motor 40 is transmitted to a driving shaft 25 through a timing belt 24 so as to rotate the driving pulleys 35 disposed on both ends of the driving shaft 25.

The image reader 41 is capable of reading the image on the document surface transferred by the document transfer device 42. Specifically, as shown in FIG. 2, the first scanning unit 45 is moved to a reading zone (reading position) under a document reading glass 65, and in accordance with the position of the first scanning unit 45, the position of the second scanning unit 46 is determined. In this state, the document transfer device 42 starts transfer of the document.

The document transfer device 42 includes a pick-up roller 55, a document tray 56, document discharge rollers 58, registration rollers 62, the document reading glass 65, a reading guide plate 66 and a discharge tray 49. The configurations of these elements are conventionally known and therefore will not be elaborated here.

The lighting device 51 includes a light guide member 72 and a reflection plate 73. The light guide member 72 directly guides light that the LED array (light sources) 71 emit to the document side and guides the light to the reflection plate 73. The reflection plate 73 reflects the light guided by the light guide member 72 to the document side.

Figure 6:
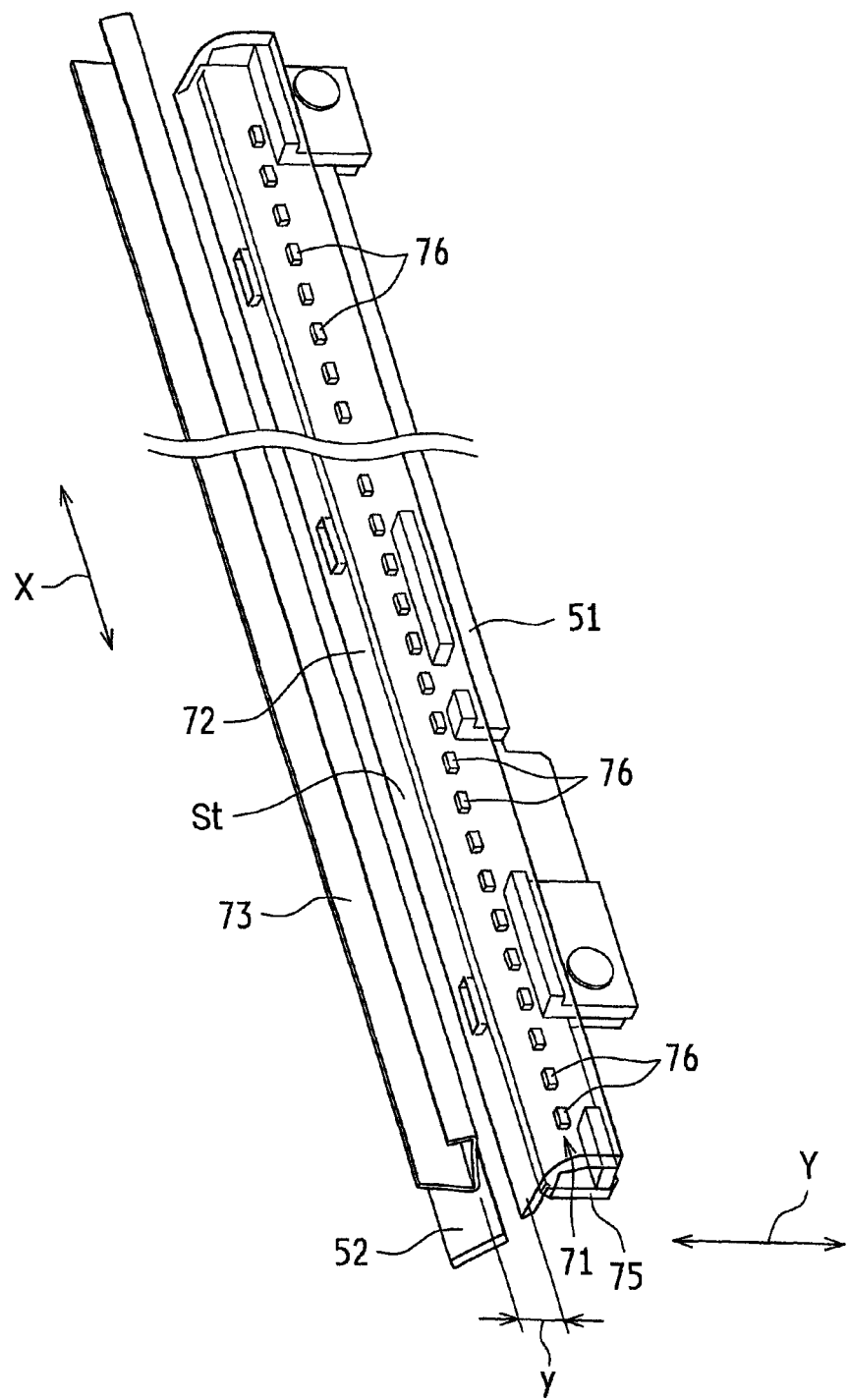
FIG. 6 is a schematic perspective view of a first scanning unit.

Next, a configuration of the lighting device 51 will be described by referring to FIG. 6. FIG. 6 is a schematic perspective view of the first scanning unit 45.

The first scanning unit 45 includes the lighting device 51, the first reflection mirror 52, and a moving frame 74 (see FIGS. 3 and 4). On the moving frame 74, the lighting device 51 and the first reflection mirror 52 are mounted.

The lighting device 51 includes a substrate 75, the LED array 71 mounted on the substrate 75, the light guide member 72 secured to and supported by the substrate 75, and the reflection plate 73. The substrate 75, the LED array 71, the light guide member 72, and the reflection plate 73 have their longitudinal lengths oriented in the horizontal scanning direction X associated with document reading, and the longitudinal lengths are approximately equivalent to the reading range of the horizontal scanning direction X.

The LED array 71 is made up of a plurality of LED elements (light emitting devices) 76 arranged on the substrate 75 in a row in the horizontal scanning direction X. The LED elements 76 are coupled to a wiring pattern of the substrate 75, and the wiring pattern of the substrate 75 is coupled to a driver circuit (not shown) mounted in the moving scanning frame 74 through a harness (not shown). The driver circuit supplies power to the LED elements 76 through the harness and the wiring pattern of the substrate 75 to control the LED elements 76 to be turned on and off.

A slit St oriented in the horizontal scanning direction X is defined between the LED array 71 and the reflection plate 73. Immediately above the slit St, an illumination range y is set in the vertical scanning direction Y. Immediately under the slit St, the first reflection mirror 52 is positioned (see FIG. 2).

In this configuration, in continuous reading of the images on the surfaces of documents transferred by the document transfer device 42, the image reader 41 moves the first scanning unit 45 to the reading zone (reading position) under the document reading glass 65 and fixes the first scanning unit 45 in place as shown in FIG. 2. In this state, the image reader 41 starts reading the documents continuously transferred by the document transfer device 42.

In this case, in continuous reading of a large quantity of documents continuously transferred by the document transfer device 42, the first scanning unit 45 is fixed at the reading position and the LED elements 76 continue lighting for a long period of time (or do the lighting semi-continuously, that is, are turned off only during the time between the documents transferred side by side). This causes a rise in temperature of the LED elements 76, as described above in the context of the conventional art. In this case, the LED elements 76 disposed at the center in the horizontal scanning direction X encounter a particularly higher rise in temperature than the LED elements 76 disposed on the sides in the horizontal scanning direction X.

In view of this, this embodiment provides a cooling structure that efficiently cools the LED elements 76 disposed at the center in the horizontal scanning direction X. The cooling structure according to this embodiment will be described in detail below by referring to specific examples.

SPECIFIC EXAMPLE 1

FIGS. 4 and 5 are schematic cross-sectional views of the housing of the image reader according to specific example 1. The cooling structure according to specific example 1 will be described below by referring to FIGS. 3 to 5.

In specific example 1, an air intake port 81 is disposed on a side surface 43c (hereinafter referred to as left side surface) of the housing 43 of the image reader. The side surface 43c is nearer to the reading position of the first scanning unit 45 in continuous reading. An air exhaust port 91 is disposed on the rear side surface 43b of the housing 43 of the image reader.

More specifically, the air intake port 81 is disposed on the left side surface 43c close to the front side surface 43a (more precisely, a position approximately abutting on the front side surface 43a). The opening of the air intake port 81 is open thoroughly in the height direction, extending approximately from the lower end to the upper end of the left side surface 43c. Also in specific example 1, the air intake port 81 has a rectangular shape as shown in FIG. 5. This, however, is not intended as limiting the shape of the air intake port 81. Other examples include a circular shape and an oval shape. This also applies to specific examples 2 to 4, described later.

A distance L1 (see FIG. 3) is the distance in the vertical scanning direction X between the left side surface 43c, on which the air intake port 81 is formed, and the LED array 71 of the first scanning unit 45. The air exhaust port 91 is disposed at a position on the rear side surface 43b that is spaced apart from the LED array 71 in the vertical scanning direction X by approximately the same distance (≈L1). The air exhaust port 91 has a laterally elongated shape and extends approximately between the lower end of the rear side surface 43b and the height position of the guide tracks 39 supporting the second scanning unit 46. Specifically, the air exhaust port 91 has a height width that is approximately ⅓ of the height width of the rear side surface 43b. Thus, the diameter of the air exhaust port 91 is smaller than the diameter of the air intake port 81. This increases the speed of air intake in the vicinity of the air exhaust port 91, and as a result, increases the overall speed of cooling air (air) flowing in the housing 43 of the image reader. That is, the cooling effect increases.

The air exhaust port 91 faces an exhaust fan 96 across an exhaust duct 95.

Thus, the positions and diameters of the air intake port 81 and the air exhaust port 91 are devised. This makes the imaginary line S of the air flow path extending from the air intake port 81 to the air exhaust port 91 pass adjacent the center (the portion indicated by the symbol R in FIGS. 3 and 5) of the LED array 71 of the first scanning unit 45 in the horizontal scanning direction with the first scanning unit 45 stopped at the reading position of the transferred document, in such a manner that the imaginary line approaches the LED elements 76 (more specifically, the imaginary line passes below and across the LED elements 76 (below the moving case 74) at an angle). This ensures efficient cooling of the vicinity of the center (peripheral portions of the center including the center itself) of the LED elements 76, where the temperature rise is highest among the first scanning unit 45. The imaginary line S of the air flow path is illustrated as a line (straight line) coupling the air intake port 81 and the air exhaust port 91 to one another.

Providing the exhaust fan 96 instead of a ventilation fan such as those disclosed in patent documents 1 and 2 reduces dust entering the housing 43 of the image reader. Arranging the exhaust fan 96 on the outer side of the housing 43 of the image reader eliminates the need for making space in the housing 43 of the image reader for installing the fan, causing no limitation as to how to arrange the elements in the housing 43 of the image reader.

Also in specific example 1, the imaginary line S crosses, at an angle, the direction (horizontal scanning direction) X in which the LED elements 76 are arranged. Specifically, as viewed from a direction perpendicular to the scanning surface of the first scanning unit 45 (which is the case of FIG. 3), the imaginary line S crosses, at an angle, the direction (horizontal scanning direction) X in which the LED elements 76 are arranged (specifically, the imaginary line S crosses the direction (horizontal scanning direction) X in which the LED elements 76 are arranged as if to pass through the vicinity R of the center of the LED array 71 at an angle from the lower left to the upper right). Similarly, as viewed from the horizontal scanning direction X along the horizontal scanning surface of the first scanning unit 45 (which is the case of FIG. 4), and as viewed from the vertical scanning direction Y (which is the case of FIG. 5), the imaginary line S crosses, at an angle, the direction (horizontal scanning direction) X in which the LED elements 76 are arranged (specifically, the imaginary line S crosses the direction (horizontal scanning direction) X in which the LED elements 76 are arranged as if to pass through the vicinity R of the center of the LED array 71 at an angle from the upper left to the lower right).

Thus, the imaginary line S crosses, at an angle, the arrangement direction in the vicinity of the center of the LED array 71. This ensures efficient sending of cooling air to the vicinity of the center of the LED array 71, and ensures efficient cooling of the LED elements 76 in the vicinity of the center of the LED array 71, thereby inhibiting a rise in temperature.

SPECIFIC EXAMPLE 2

Figure 7:
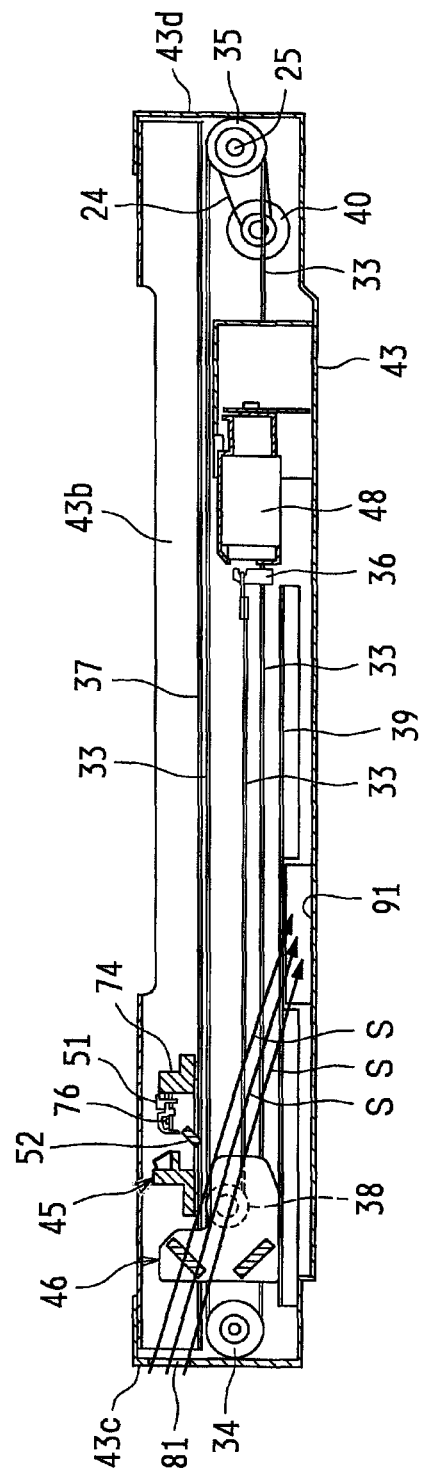
FIG. 7 is a schematic cross-sectional view along the line A-A shown in FIG. 3, corresponding to specific example 2.
Figure 8:
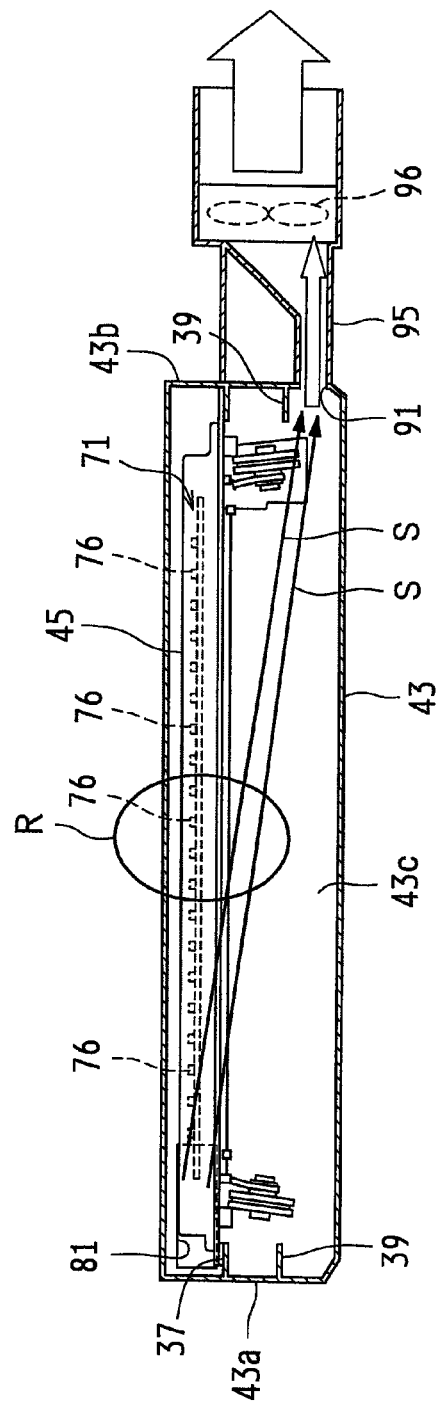
FIG. 8 is a schematic cross-sectional view along the line B-B shown in FIG. 3, corresponding to specific example 2.

FIG. 7 is a schematic cross-sectional view along the line A-A shown in FIG. 3, corresponding to specific example 2. FIG. 8 is a schematic cross-sectional view along the line B-B shown in FIG. 3, corresponding to specific example 2.

In specific example 1, the air intake port 81 is open thoroughly in the height direction, extending approximately from the lower end to the upper end of the front side surface 43a. In specific example 2, the air intake port 81 is formed only at an upper portion of the left side surface 43c. Specifically, the air intake port 81 has a laterally elongated shape and extends approximately between the upper end of the left side surface 43c and the height position of the upper guide tracks 37 supporting the first scanning unit 45. The air exhaust port 91 is formed at a lower portion of the rear side surface 43b, similarly to specific example 1.

Thus, providing the air intake port 81 at an upper portion and the air exhaust port 91 at a lower portion makes the imaginary line S of the air flow path concentrated in such a manner that the imaginary line S crosses the direction (horizontal scanning direction X) in which the LED elements 76 are arranged at an angle from the upper left to the lower right at the vicinity R of the center of the LED array 71, as shown in FIGS. 7 and 8. That is, the air flow path is concentrated to the vicinity R of the center of the LED array 71. This ensures efficient cooling of the LED elements 76 in the vicinity of the center (peripheral portions of the center including the center itself) of the LED array 71, thereby inhibiting a rise in temperature.

SPECIFIC EXAMPLE 3

Figure 9:
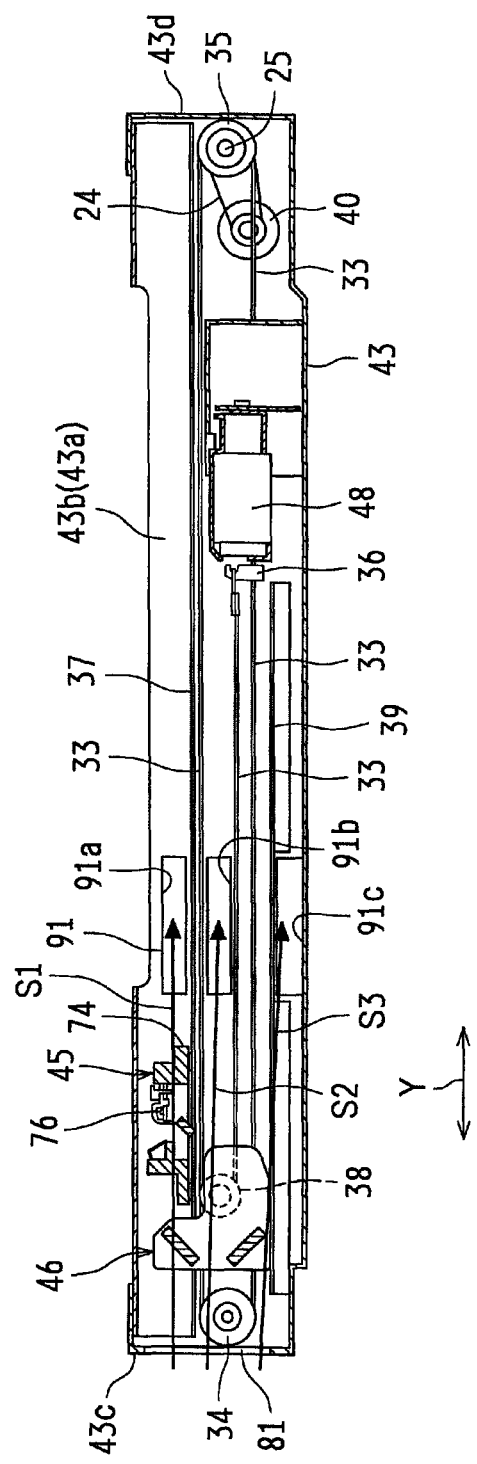
FIG. 9 is a schematic cross-sectional view along the line A-A shown in FIG. 3, corresponding to specific example 3.
Figure 10:
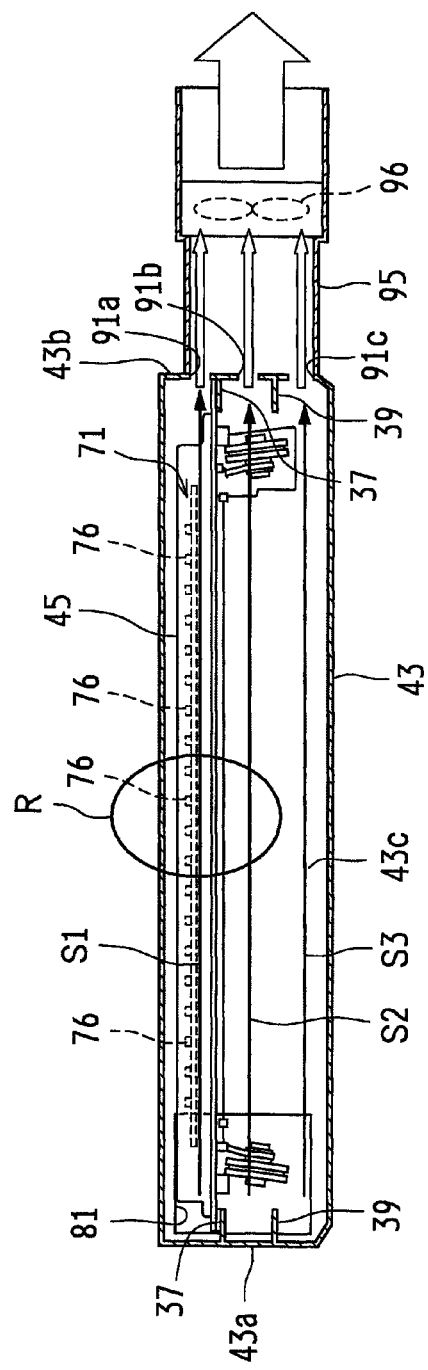
FIG. 10 is a schematic cross-sectional view along the line B-B shown in FIG. 3, corresponding to specific example 3.

FIG. 9 is a schematic cross-sectional view along the line A-A shown in FIG. 3, corresponding to specific example 3. FIG. 10 is a schematic cross-sectional view along the line B-B shown in FIG. 3, corresponding to specific example 3.

In specific example 1, the air exhaust port 91 has a laterally elongated shape and extends approximately between the lower end of the rear side surface 43b and the height position of the lower guide tracks 39 supporting the second scanning unit 46. In specific example 3, the air exhaust port 91 is approximately thoroughly open approximately from the lower end to the upper end of the rear side surface 43b. Considering that the two upper and lower guide tracks 37 and 39 cross the air exhaust port 91 in operation, the air exhaust port 91 according to specific example 3 includes three air exhaust ports 91a, 91b, and 91c vertically classified by the guide tracks 37 and 39.

The air intake port 81 is thoroughly open extending approximately from the lower end to the upper end of the left side surface 43c, similarly to specific example 1.

With this configuration, the imaginary line S of the air flow path for air taken in from the air intake port 81 turns into three imaginary lines S1, S2, and S3 respectively directed to the three air exhaust ports 91a, 91b, and 91c. The imaginary line S1 passes adjacent the LED elements 76, while the imaginary line S2 passes under the LED elements 76 (specifically, adjacent and under the moving frame 74), forming air flow paths that pass adjacent and above and under the LED array 71. This further makes the air flow paths concentrated to the LED array 71, and ensures more efficient cooling of the LED elements 76 in the vicinity of the center (peripheral portions of the center including the center itself) of the LED array 71, thereby more reliably inhibiting a rise in temperature.

SPECIFIC EXAMPLE 4

Figure 11:
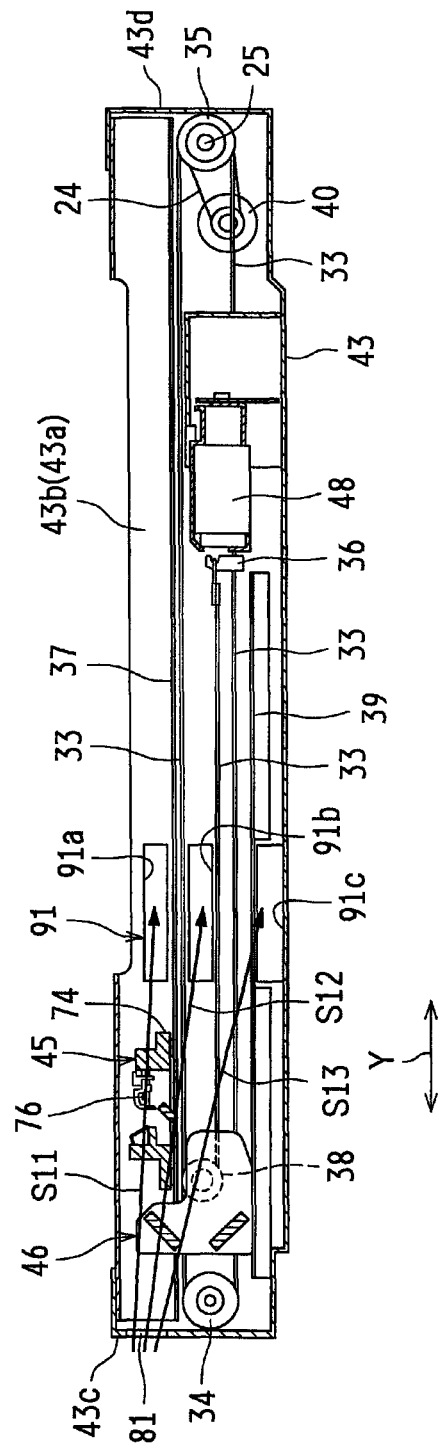
FIG. 11 is a schematic cross-sectional view along the line A-A shown in FIG. 3, corresponding to specific example 4.
Figure 12:
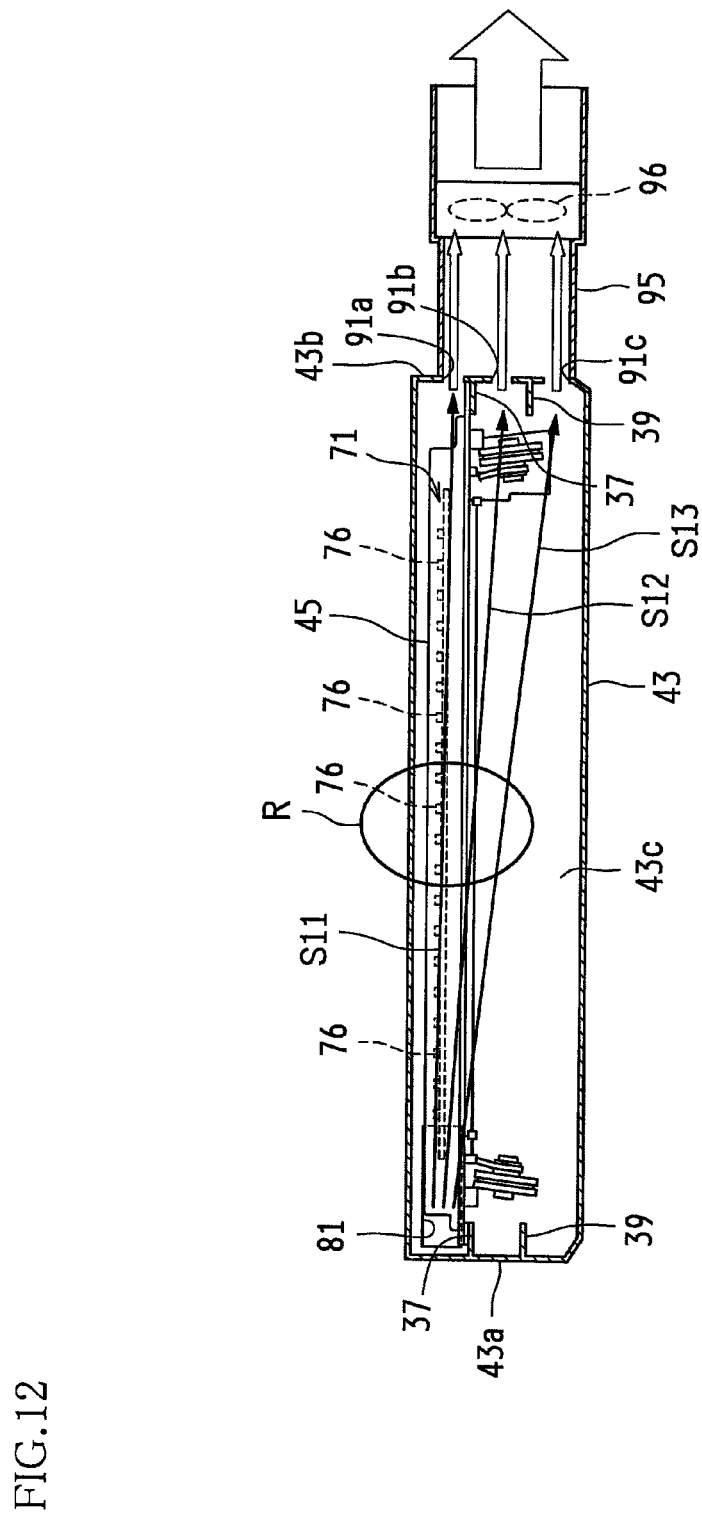
FIG. 12 is a schematic cross-sectional view along the line B-B shown in FIG. 3, corresponding to specific example 4.

FIG. 11 is a schematic cross-sectional view along the line A-A shown in FIG. 3, corresponding to specific example 4. FIG. 12 is a schematic cross-sectional view along the line B-B shown in FIG. 3, corresponding to specific example 4.

In specific example 3, the air intake port 81 is approximately thoroughly open approximately from the lower end to the upper end of the left side surface 43c. In specific example 4, the air intake port 81 is formed only at an upper portion of the left side surface 43c. Specifically, the air intake port 81 has a laterally elongated shape and extends approximately between the upper end of the left side surface 43c and the height position of the upper guide tracks 37 supporting the first scanning unit 45.

The air exhaust port 91 includes the three air exhaust ports 91a, 91b, and 91c vertically classified by the guide tracks 37 and 39, similarly to specific example 3.

With this configuration, the imaginary line S of the air flow path for air taken in from the air intake port 81 turns into three imaginary lines S11, S12, and S13 respectively directed to the three air exhaust ports 91a, 91b, and 91c. The imaginary line S11 passes adjacent the LED elements 76, the imaginary line S12 passes under the LED elements 76 (specifically, adjacent and under the moving frame 74), and the imaginary line S13 passes further under the moving frame 74, forming air flow paths that pass adjacent and above and under the LED array 71. This further makes the air flow paths concentrated to the LED array 71, and ensures more efficient cooling of the LED elements 76 in the vicinity of the center (peripheral portions of the center including the center itself) of the LED array 71, thereby more reliably inhibiting a rise in temperature.

As described above, in specific examples 1 to 4, the air intake port 81 is disposed at only one position of the left side surface 43c. Thus, providing the air intake port 81 at one position ensures a reliable flow path (air flow path) of cooling air that prevents air from dispersing in the housing 43 of the image reader, that is, ensures a flow path of cooling air from the air intake port to the air exhaust port.

Figure 16:
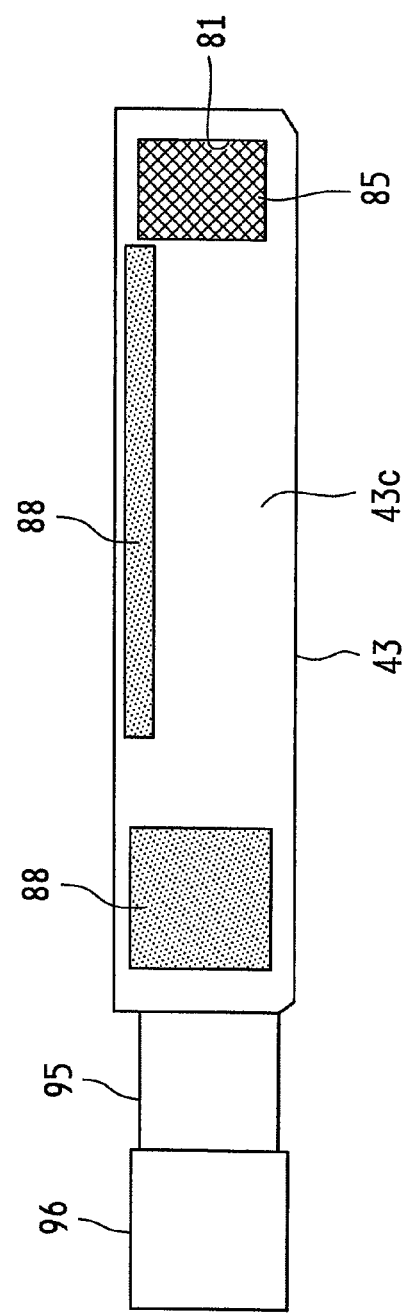
FIG. 16 illustrates the right side surface of the housing of the image reader.

Also in this embodiment, the air intake port 81 may be provided with a dust preventive filter 85 (see FIG. 16). Providing the dust preventive filter 85 on the air intake port 81 prevents entrance of external dust and reduces the occurrence of external dust being attached to the dust-sensitive optical systems (such as the first scanning unit 45, the second scanning unit 46, the imaging lens 47, and the CCD 48). This dust preventive filter may also be disposed on the air exhaust port 91 side.

Figure 13:
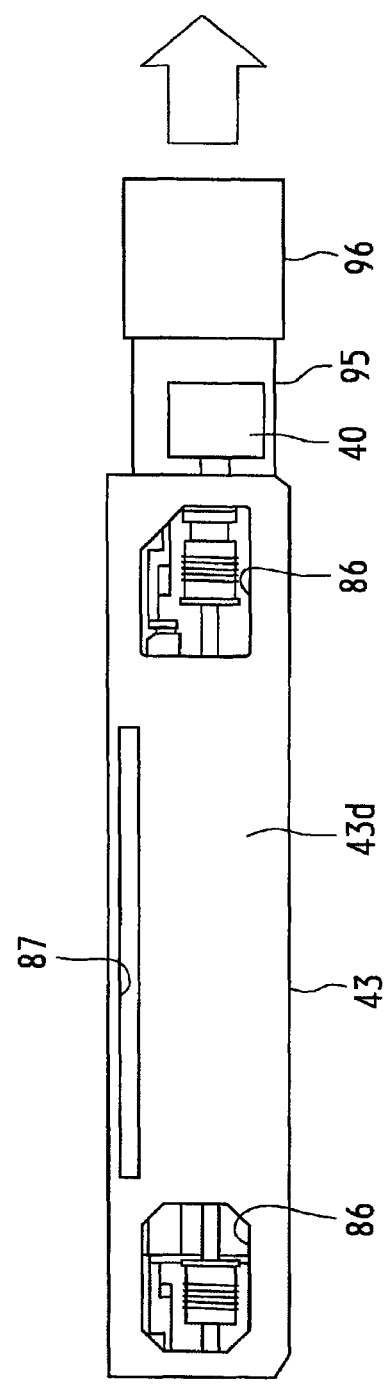
FIG. 13 illustrates the left side surface of the housing of the image reader.
Figure 14:
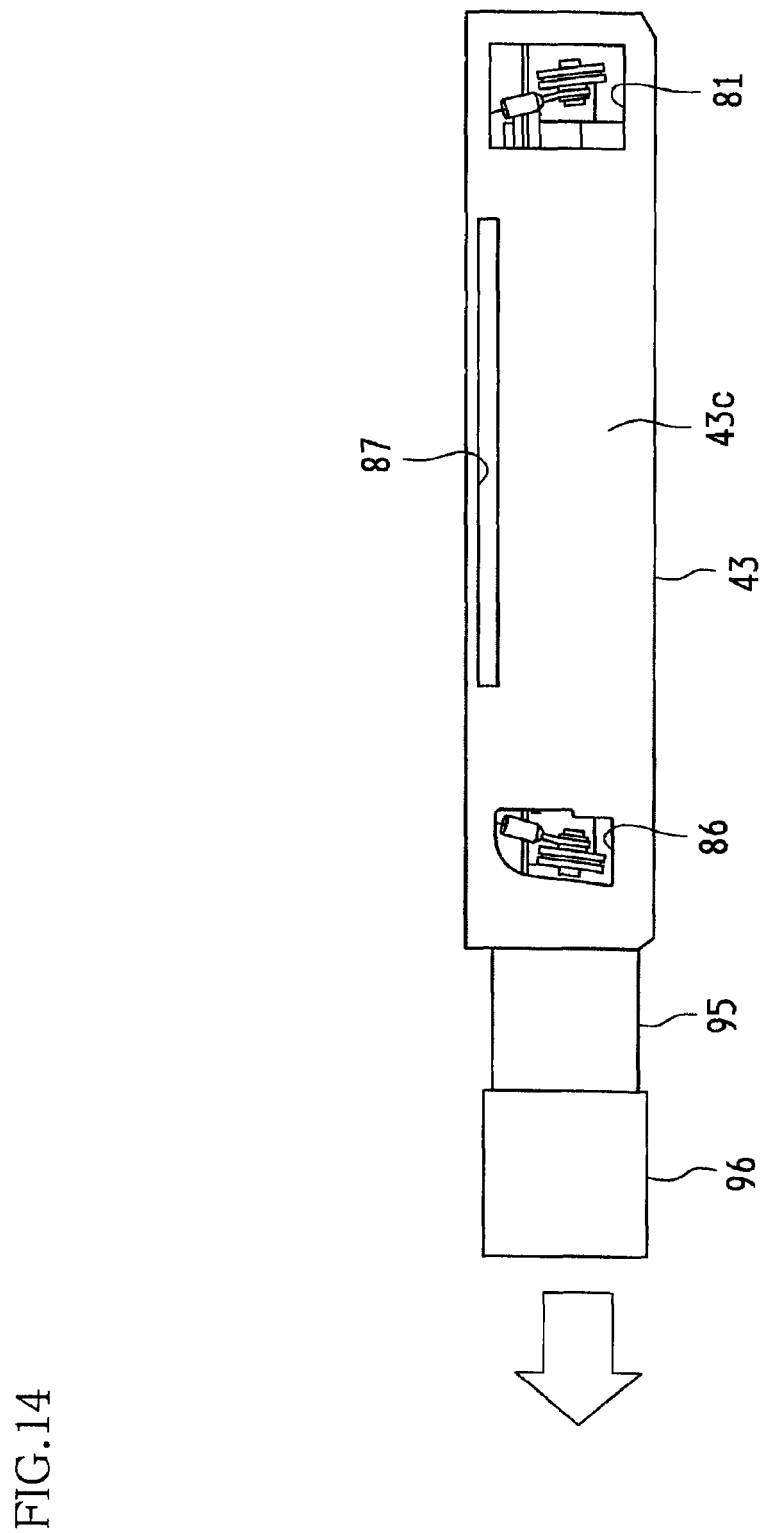
FIG. 14 illustrates the right side surface of the housing of the image reader.
Figure 15:
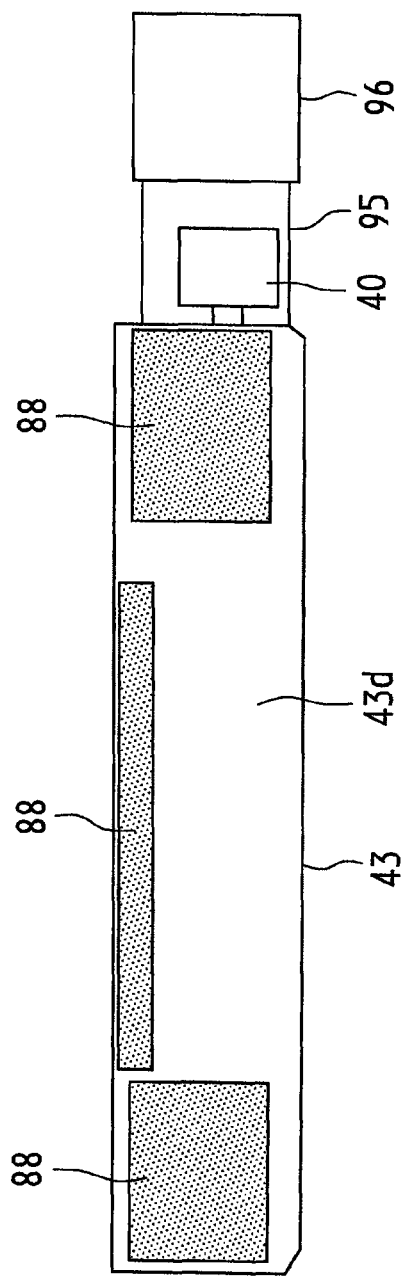
FIG. 15 illustrates the left side surface of the housing of the image reader.

Also in this embodiment, the openings of the housing 43 of the image reader other than the air intake port 81 and the air exhaust port 91 may be shielded by a shield member. As shown in FIG. 13, which shows the left side surface 43c of the housing 43 of the image reader, and as shown in FIG. 14, which shows the right side surface 43d of the housing 43 of the image reader, openings 86 through which to mount parts are disposed on the side surfaces of the housing 43 of the image reader, for example. The housing itself has gaps 87. The existence of the openings 86 and the gaps 87 makes part of the air taken in from the air intake port 81 flow to the openings 86 and the gaps 87 instead of flowing to the air exhaust port 91, causing degradation of the cool efficiency. In view of this, in this embodiment, as shown in FIGS. 15 and 16, the openings of the housing 43 of the image reader such as the openings 86 and the gaps 87 other than the air intake port 81 and the air exhaust port 91 are shielded by a shield member 88.

Examples of the shield member 88 include a black PET sheet, which would be adhered to the housing using, for example, a double-side tape. The blackness of the PET sheet makes its reflectance low, and even if light from the light source is incident on the PET sheet, the light does not enter the CCD 48 as stray light, or even if the light enters the CCD 48, this does not cause any problem on the read image.

Thus, shielding by the shield member 88 the openings such as the openings 86 and the gaps 87 other than the air intake port 81 and the air exhaust port 91 further increases the cooling effect and further reduces attachment of external dust to the optical systems (such as the first scanning unit 45, the second scanning unit 46, the imaging lens 47, and the CCD 48). Reducing dust attachment reduces image failure (such as black stripes) that can be caused if dust exists on the read image.

In the present invention, the exhaust fan 96 is operated only in the continuous reading of documents using the document transfer device 42. In the case of reading a document by fixing it on the platen glass 44, the exhaust fan 96 is stopped from operating since the first scanning unit 45 continually makes reciprocating movement in the vertical scanning direction Y.

The present invention provides an image forming apparatus with improved performance and extended service life of the LED elements of the light source unit.

Lastly, the inventors conducted cooling effect tests to the image reader according to the above-described embodiment. In the tests, the air intake port 81 and the air exhaust port 91 of the configuration according to specific example 1 shown in FIGS. 3 to 5 were employed. In this state, a comparison was made between the case of providing the exhaust fan 96 for the air exhaust port 91 and the case without the exhaust fan 96. Another comparison was made between the case of not shielding the other openings 86 and gaps 87 with the exhaust fan 96 employed and the case of shielding them with the exhaust fan 96 employed. Temperatures were measured using a temperature sensor at two positions, namely at the center of the substrate 75 of the LED elements 76 and at the opposite end side of the exhaust fan 96. The test results are shown in FIG. 17.

As seen from FIG. 17, in the case of not providing the exhaust fan 96 for the air exhaust port 91, the temperature of the center of the substrate was 81.4° C. and the temperature of the end of the substrate was 73.2° C. at room temperature of 25° C. Thus, the temperature difference between the center of the substrate and the end of the substrate was 8.2° C.

In the case of providing the exhaust fan 96 as in specific example 1 shown in FIGS. 3 to 5, the temperature of the center of the substrate was 72.6° C., which is a reduction as compared with 81.4° C. (−8.8° C.). The temperature of the end of the substrate was 67.3° C., which is a reduction as compared with 73.2° C. (−5.9° C.). Thus, the temperature difference between the center of the substrate and the end of the substrate was 5.3° C. That is, in terms of the difference in temperature reduction, [(2)−(1)], the center of the substrate experienced an additional temperature reduction of 2.9° C. as compared with the end of the substrate.

That is, although the temperature of the center of the substrate is higher than the end of the substrate, the reduction in temperature (temperature difference) of the center of the substrate, 8.8° C., is larger than the reduction in temperature of the end of the substrate, which is as low as 5.9° C. This result shows that use of the exhaust fan 96 to make the air flow path pass across the center of the substrate provides a sufficient temperature reducing effect at the center of the substrate.

Further, in the case of shielding the openings 86 and the gaps 87 by the shield member 88 as shown in FIGS. 15 and 16 under the conditions of specific example 1, the temperature of the center of the substrate was 64.7° C., which is a reduction as compared with 81.4° C. (−16.7° C.). The temperature of the end of the substrate was 63.8° C., which is a reduction as compared with 73.2° C. (−9.4° C.). Thus, the temperature difference between the center of the substrate and the end of the substrate was 0.9° C. That is, in terms of the difference in temperature reduction, [(3)−(1)], the center of the substrate experienced an additional temperature reduction of 7.3° C. as compared with the end of the substrate.

That is, the reduction in temperature (temperature difference) of the center of the substrate, 16.7° C., is larger than the reduction in temperature of the end of the substrate, which is as low as 9.4° C. This result shows that use of the exhaust fan 96 to make the air flow path pass across the center of the substrate while at the same time using the shield member 88 to shield the openings 86 and the gaps 87 provides a more sufficient temperature reducing effect at the center of the substrate.

In the comparison between the case of not shielding the openings 86 and gaps 87 with the exhaust fan 96 employed and the case of shielding the openings 86 and gaps 87 with the exhaust fan 96 employed, the temperature of the center of the substrate was 64.7° C., which is a reduction as compared with 72.6° C. (−7.9° C.). The temperature of the end of the substrate was 63.8° C., which is a reduction as compared with 67.3° C. (−3.5° C.). In terms of the difference in temperature reduction, [(3)−(2)], the center of the substrate experienced an additional temperature reduction of 4.4° C. as compared with the end of the substrate.

That is, the reduction in temperature (temperature difference) of the center of the substrate, 7.9° C., is larger than the reduction in temperature of the end of the substrate, which is as low as 3.5° C. This result also shows that use of the exhaust fan 96 to make the air flow path pass across the center of the substrate while at the same time using the shield member 88 to shield the openings 86 and the gaps 87 provides a more sufficient temperature reducing effect at the center of the substrate.

The present invention can be embodied and practiced in other different forms without departing from the spirit and essential characteristics of the present invention. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

What is claimed is:

1. An image reader comprising a light source unit comprising light sources comprising a plurality of light emitting devices that are arranged in a row in a horizontal scanning direction and that are configured to emit light to a document,
   wherein a housing of the image reader includes an air intake port for taking outside air into the housing of the image reader and an air exhaust port for discharging air in the housing of the image reader,
   wherein the light sources are interposed in an air flow path coupling the air intake port and the air exhaust port to one another, and
   wherein an imaginary line of the air flow path coupling the air intake port and the air exhaust port to one another is configured to pass adjacent a center of the light sources of the light source unit in the horizontal scanning direction when the light source unit is stopped at a reading position where it can read documents transferred by a document transfer device.

2. The image reader according to claim 1, wherein the imaginary line is configured to cross, at an angle, a direction in which the light emitting devices are arranged.

3. The image reader according to claim 2, wherein as viewed from a direction perpendicular to a scanning surface of the light source unit, the imaginary line is configured to cross, at an angle, the direction in which the light emitting devices are arranged.

4. The image reader according to claim 2, wherein as viewed from the horizontal scanning direction along a horizontal scanning surface of the light source unit, or as viewed from a vertical scanning direction orthogonal to the horizontal scanning direction along the horizontal scanning surface of the light source unit, the imaginary line is configured to cross, at an angle, the direction in which the light emitting devices are arranged.

5. The image reader according to claim 1, wherein the air intake port and the air exhaust port are disposed on side surfaces of the housing of the image reader.

6. The image reader according to claim 1, wherein an exhaust fan is disposed on an outer side of the housing of the image reader to face the air exhaust port.

7. The image reader according to claim 1, wherein the air intake port is disposed at one position of the housing of the image reader.

8. The image reader according to claim 1, wherein a dust preventive filter is disposed on the air intake port.

9. The image reader according to claim 1, wherein openings of the housing of the image reader other than the air intake port and the air exhaust port are shielded by a shield member.

10. An image forming apparatus comprising: the image reader according to claim 1; and an imager configured to form a toner image of a document image read by the image reader onto a sheet of paper.

11. The image reader according to claim 1, wherein the plurality of light emitting devices are arranged in a row that extends substantially perpendicular to the direction in which documents are moved past the light source unit by the document transfer device.

12. The image reader according to claim 1, wherein the imaginary line is a substantially straight imaginary line.

* * * * *